United States Patent [19]

Lenz

[11] 4,288,185
[45] Sep. 8, 1981

[54] OUTBOARD TRACING STATION FOR CARVING MACHINE

[75] Inventor: John O. Lenz, Coon Rapids, Minn.

[73] Assignee: Kurt Manufacturing Company, Inc., Minneapolis, Minn.

[21] Appl. No.: 124,463

[22] Filed: Feb. 25, 1980

[51] Int. Cl.³ .............................................. B23K 1/16
[52] U.S. Cl. ............................ 409/121; 144/144 R; 409/93; 409/108; 409/124
[58] Field of Search ................ 409/93, 103, 107, 108, 409/109, 111, 121, 124; 144/144 R, 154

[56] References Cited

U.S. PATENT DOCUMENTS

| | | | |
|---|---|---|---|
| 1,389,462 | 8/1921 | Spreadbury | 409/93 |
| 1,721,015 | 7/1929 | Galbraith | 409/108 |
| 2,330,566 | 9/1943 | Edmonds et al. | 409/109 |
| 2,409,903 | 10/1946 | Schwartz | 409/93 |
| 2,832,894 | 4/1958 | Eisengrein et al. | 409/93 X |
| 3,543,636 | 12/1970 | Tracy | 409/107 |
| 3,640,231 | 2/1972 | Lenz | 409/93 |
| 3,777,616 | 12/1973 | Mueller | 409/109 |

*Primary Examiner*—Willaim R. Briggs
*Attorney, Agent, or Firm*—Kinney, Lange, Braddock, Westman and Fairbairn

[57] ABSTRACT

A carving machine which has universally movable multiple work spindles mounted on a frame, and movable along rails in a normal manner. The tracing station (the station which holds the pattern used in the carving operation) is located outboard of one lateral side of the rails, and outboard of the frame, so that a worker can easily trace on large patterns at the tracing station.

5 Claims, 9 Drawing Figures

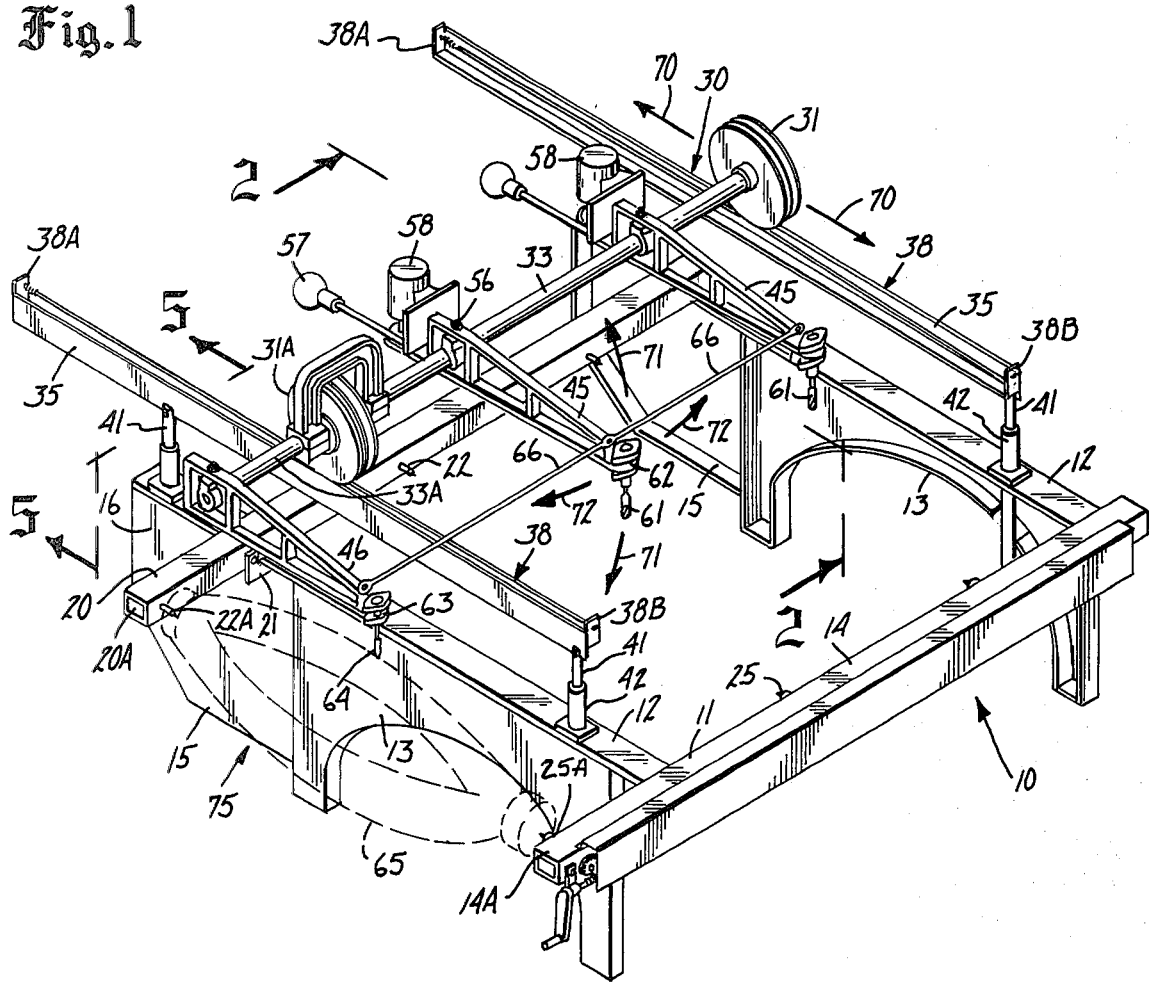
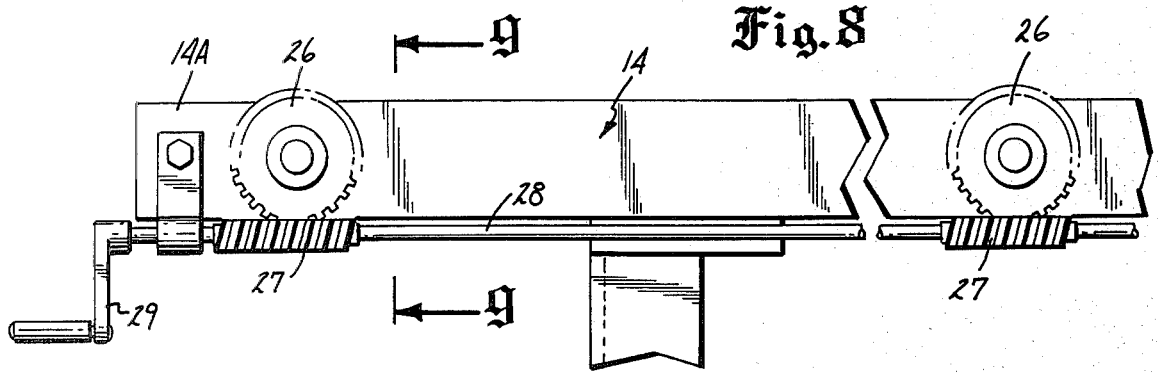
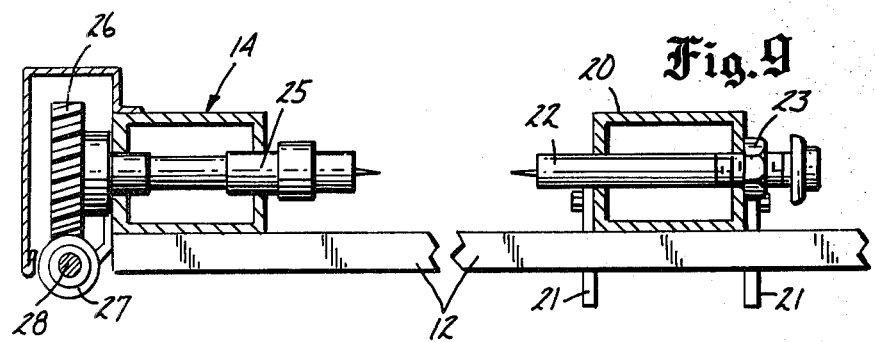

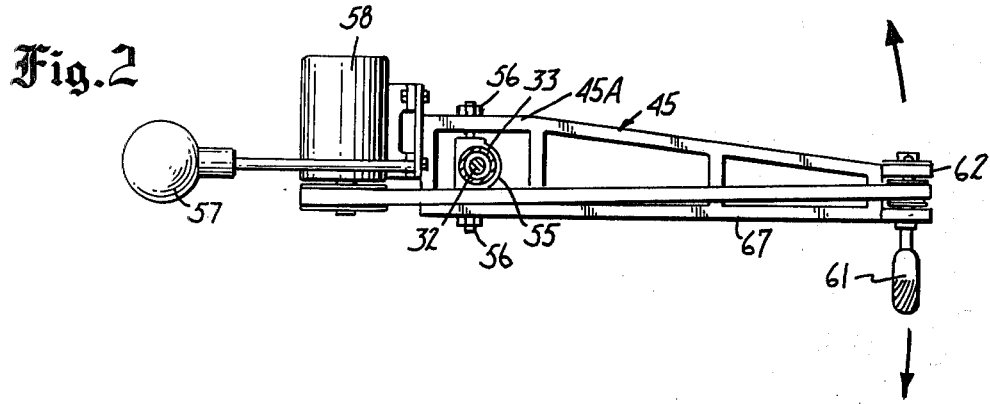
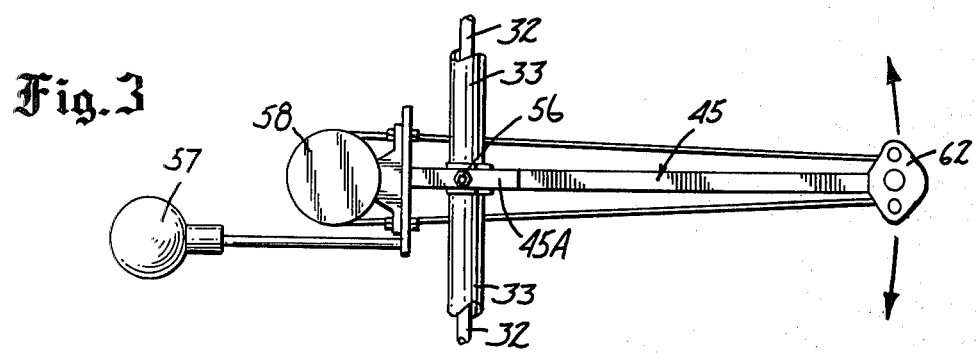
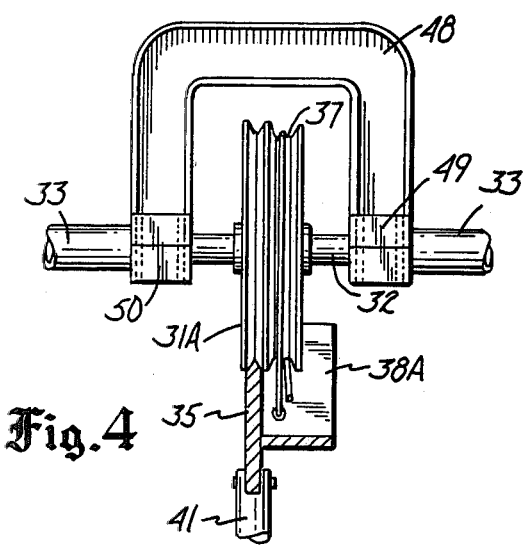
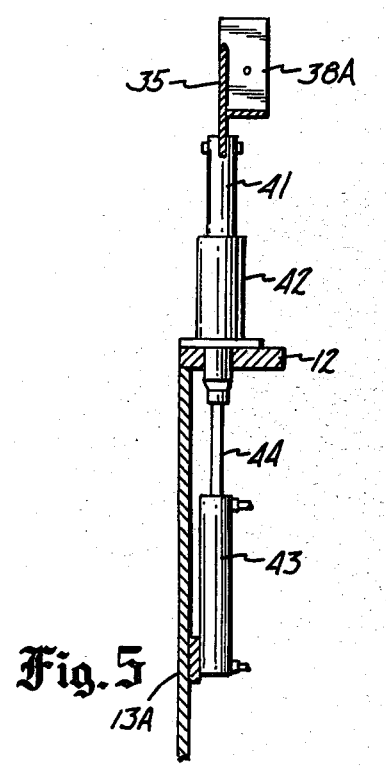

OUTBOARD TRACING STATION FOR CARVING MACHINE

BACKGROUND OF THE INVENTION

1. Field of the Invention

The present invention relates to wood carving machines and more particularly to improvements in the frame and support tracks therefore.

2. Prior Art

Various multiple spindle carving attachment devices have been advanced in the prior art. For example, the assignee of the present application, Kurt Manufacturing Company, Inc. has made and sold a carver under the model designation of "Master Carver" which is a multiple spindle carver. Also, smaller machines have been sold by the same company under the mark Northstar Carver.

The Northstar Carver, in particular, is a multiple spindle machine that is smaller than the Master Carver, but will take workpieces of substantial length. The multiple spindle machines have, generally, one tracing station in which the pattern is placed and this tracing station is located within the perimeter of the carver frame. When the tracing station is within the perimeter of the carver frame, working with long workpieces becomes a difficult task in that the stylus for the tracing station has to be moved a substantial distance within the perimeter of the machine in order to accommodate the carving operation on such long workpieces.

A further multiple station carver is shown in U.S. Pat. No. 1,721,015.

Also, it is well known to have a work station positioned directly below the carving station, as shown in U.S. Pat. No. 3,640,231.

SUMMARY OF THE INVENTION

The present invention relates to a multiple spindle carving machine which has a frame for supporting the carving spindles and support arms. The carving spindles and arms move along guide rails in a plane generally in fore and aft direction relative to the frame. The tracing station which holds a pattern that is traced with a stylus is positioned to the exterior of the rails and frame so that an operator can move easily along the longitudinal length of a workpiece pattern that is being worked upon without having to reach within the perimeter of the main frame.

The mounting carriage for the work spindles and arms is connected to the arm and stylus at the outboard tracing station through a bridge arrangement which bridges one rail on which the carriage moves. The arm and stylus at the tracing station are mounted indentically to the arms and spindles used for carving and thus the movements of the tracing stylus are duplicated at the carving spindles.

Additionally, large workpieces many times have large diameters which have to be accomodated. The rails of the present carver can be raised and lowered through the use of hydraulic cylinders to locate the carving arms close to smaller diameter workpieces for stability and still permit lifting the arms for large diameter workpieces.

BRIEF DESCRIPTION OF THE DRAWINGS

FIG. 1 is a perspective view of a carving machine made according to the present invention;

FIG. 2 is a sectional view looking at a side of a typical carving arm taken as on line 2—2 in FIG. 1;

FIG. 3 is a top plan view of the arm of FIG. 2;

FIG. 4 is a sectional view of a support rail and portions of the carriage member taken as on line 4—4 in FIG. 1;

FIG. 5 is a sectional view of a typical rail support used with the present invention and taken as on line 5—5 in FIG. 1;

FIG. 8 is a front view of the device of FIG. 1 with parts removed to show the typical means for rotating the pattern and workpieces in the carver; and FIG. 9 is a sectional view showing typically the mounting spindles for workpieces and taken as on line 9—9 in FIG. 8.

DESCRIPTION OF THE PREFERRED EMBODIMENT

Figure 7:
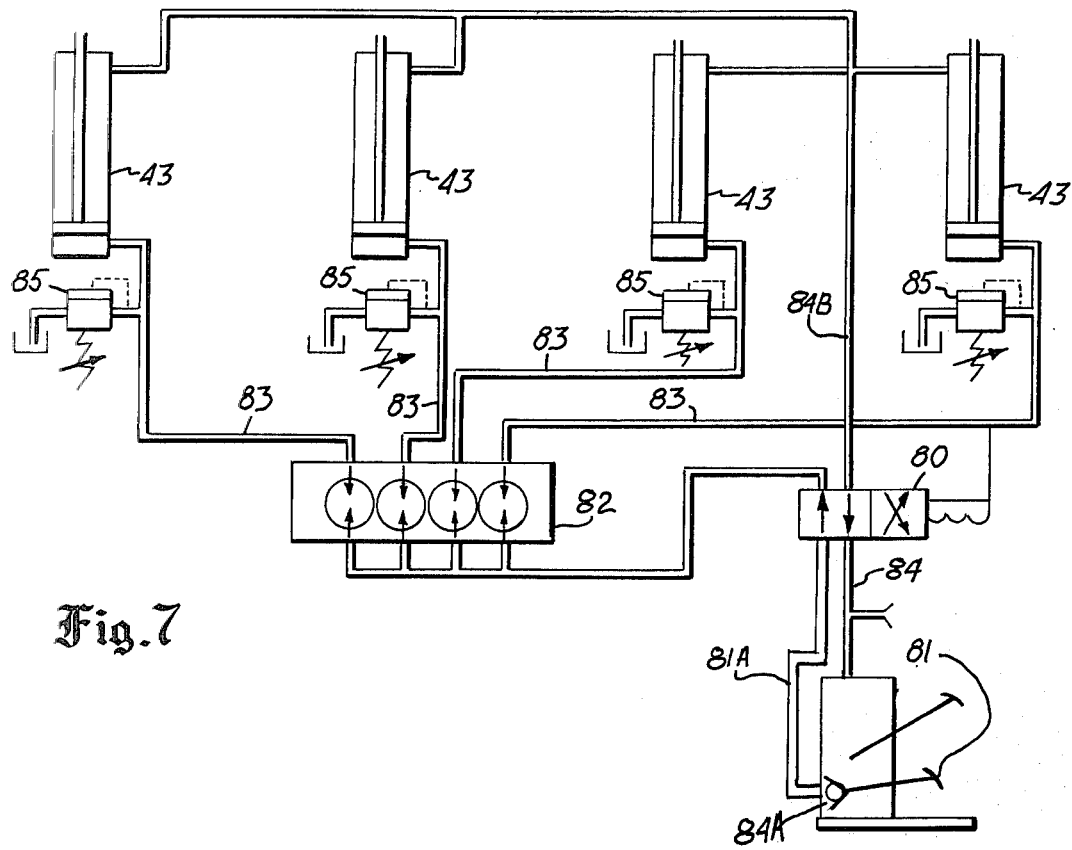
FIG. 7 is a schematic representation of the hydraulic circuitry used with the device of FIG. 1 for controlling the rail height.

A carving machine indicated generally at 10 includes a frame assembly 11. The frame assembly has side frame members 12,12 which are mounted on top of spaced support leg members 13. The frame members 12 are generally horizontal flat bars that extend fore and aft at the top of leg members 13. At the front edge of the frame a cross piece 14 holds the frame members 12 and legs 13 together. Also, at the rear of the frame suitable cross members can be utilized for holding the frame members 12 and legs 13 in parallel spaced apart relationship.

Frame supports 15,15 are attached to the rear ends of leg member 13. The members 15 extend rearwardly and upwardly and engage and support the rear frame members 12. Side panels or skirts 16 are supported on frame members 15. A rear adjustable support bar 20 is mounted on the upper sides of members 12. The support bar 20 has suitable clamps, for example those shown only schematically at 21, which releasably latch the support bar 20 onto both frame members 12, and thus the cross bar 20 can be moved fore and aft a desired amount to provide for some accommodation of different length workpieces, as will be explained.

Referring specifically to FIG. 9, the rear cross bar 20 has threadably adjustable spindle members 22 mounted thereon. The spindle members can be adjusted through nuts 23 that are welded to the back wall of the cross bar 20. The spindles extend through openings in the cross bar and have sharpened points or centers for mounting workpieces and a tracing pattern. There is one spindle 21 for each workpiece or carving arm and one spindle for the tracing station.

The front member 14, also as shown in FIGS. 8 and 9, has workpiece holding spindles 25 rotatably mounted therethrough parallel to spindles 22, and each of the spindles 25 has a center pin for receiving an opposite end of the workpiece or pattern from the end held in the aligning spindle 22. The forward ends of the spindles 25 on the front of member 14 have worm gears 26 drivably mounted thereon and these are driven by a separate worm drive screw 27. Each worm drive screw 27 is mounted onto a worm shaft 28, and is driven by a crank 29 adjacent one end 14A of the cross member 14 and outside the frame sides of the carving machine. The driving of the worm gears 26 is for rotating the patterns and workpieces for three dimensional carving.

It is of special importance to note that the cross member 20 has a portion 20A which extends laterally outside one frame member 12 and the end portion 14A of front member 14 also extends out beyond the same lateral side frame member of the frame assembly. The side frame members 12 establish the perimeter of the frame assembly. Thus, one of the spindles 25 on member 14, which is indicated at 25A, is to the outside of the perimeter of the space defined between the frame members 12,12 and a spindle 22A is also outside of the perimeter of the area defined between the frame members 12,12.

The carving arm and spindle carriage, which is indicated generally at 30, comprises a pair of support wheels 31 and 31A which are drivably mounted on a center shaft 32 over which a tube 33 is rotatably mounted (see FIGS. 2 and 4). The center shaft is drivably mounted to the wheels 31, and the shaft 32 passes through the wheel 31A to the outside of the frame perimeter. The shaft 32 is mounted in suitable bushings on the interior of the tube 33. The wheels 31 and 31A as shown, in FIG. 4 in particular, have V shaped grooves that are of size to receive the upper edges of a pair of track members or rails 36, and also the wheels 31 and 31A each have a cable 38 wrapped around a side section 37 of each wheel. The cables 38 are wrapped over wheel sections 37 and are fastened to brackets 38A and 38B, at the respective ends of the rails 35. The cable wrap around sections 37 of the wheels 31 and 31A is used on carving machines at the present time to keep the wheels properly aligned. The cables prevent one of the wheels from moving without having the other wheel move as well and thus keeps the axis of shaft 32 perpendicular to rails 35.

The tracks or rails 35 are each mounted for adjustment vertically relative to one of the frame members 12,12. The rails are mounted for vertical movement to accommodate workpieces of differing diameters and without losing any stability for the carving arms and carriages. Each of the rails 35 is mounted on a vertical shaft 41 with a suitable pin, as shown in FIG. 5. The shafts 41 in turn are slidably mounted in a mounting hub or housing 42 that in turn is fixedly attached to the respective frame member 12. The front shafts 41, as can be seen in FIG. 1 are adjacent the front corners of the rails, but it can also be seen that the rails 35 extend rearwardly beyond the rear shafts 41 (which are at the rear ends of frame member 12) and thus protrude out rearwardly beyond the ends of the frame members 12. The front ends of the rails 35 and the support shafts 41 are spaced rearwardly from the front ends of the frame members 12.

Each of the shafts 41 is held positioned at a desired location along its longitudinal axis through the use of a separate hydraulic cylinder 43 that is mounted in a suitable manner to a frame portion 13A of the respective leg member. The hydraulic cylinders 43 are controlled so that they each extend and retract an equal distance to the others of the cylinders 43. There are thus four of the shafts 41 (two for each rail) and four of the cylinders 43 as well.

The extension and retraction of the cylinder rods 44 of the cylinders 43 is controlled by fluid under pressure inside the cylinders. The extension of the cylinder rods controls the height of the respective rail 35 and thus the height of the carriage 30 above the cross members 20 and 14. This then regulates the height of the carving arms to keep them properly positioned to clear workpieces and patterns of different diameters.

The carriage 30 includes three arms including two work station carving arms 45, and a tracing station arm 46. The outer end of the shaft 42, which extends laterally outside the frame member 12 adjacent the portion 20A of the cross bar 20, has a tube member 33A mounted thereon which is positioned at the outside of the wheel 31A. The tube member 33A is rotatably mounted on the shaft 32 with suitable bushings, and is held in precise alignment with and moves with the main tube 33 with a yoke member 48 (FIG. 4) by a split clamp 49 gripping the tube 33 on one side of the wheel 31A, and a split clamp 50 gripping the tube 33A on the outside of the wheel 31A. The yoke 48 forms a bridge that rigidly secures the two tube portions 33 and 33A for simultaneous movement, and in axial, end to end alignment.

The arms 45 and the arm 46 each have hub portions 45A and 46A, respectively, that are pivotally mounted with respect to collars 55 that in turn are clamped or fastened in a suitable manner to the respective tubes 33 and 33A, respectively. The pivot members on the collars are shown at 56, and permit the arms 45 and 46 to swing or pivot from side to side about axes perpendicular to the axis of the tube 33 and thus perpendicular to the axis of shaft 33. Counterweights 57 are provided at the back of the arms 45. Drive motors 58 are mounted on the arms 45 and utilized to drive the shafts or spindles of cutter members 61 rotatably mounted at the outer or working ends of the arms. The shafts for the cutters are mounted in suitable housings 62. The outer end of the arm 46 has a stylus mounting housing 63 thereon, which is used to mount a stylus 64 that is used in connection with a pattern indicated generally in dotted lines at 65 which is mounted in a tracing station 75. The cutter members 61 simulate the movement or duplicate the movement of the stylus member 64 in the usual manner. The outer ends of the arm 44 and arms 45 are joined together with suitable tie rods 66, so that the arms all move as parallel arms. The tie rods 66 have suitable spherical bearing rod ends through which the rods are connected to the respective arms, and thus when the arm 46 is moved, the arms 45 are slave arms that follow the tracing station arm movements exactly.

It should be noted that each of the cutters 61 are driven through a belt and pulley shown generally at 67 extending from a motor 58 on each arm up to the shaft that is mounted in the housing 62. The arms 45 can thus move in direction as indicated by the arrows 70 along the rails 35, as well as about the axis of the shaft 32 (tubes 33 and 33A rotate relative to shaft 32) as indicated by the arrows 71, and the outer ends of the arms 45 and 46, including the stylus member 64 and the cutter members 61, also are movable about the pivots of the members 56, as indicated by the arrows 72.

Figure 6:
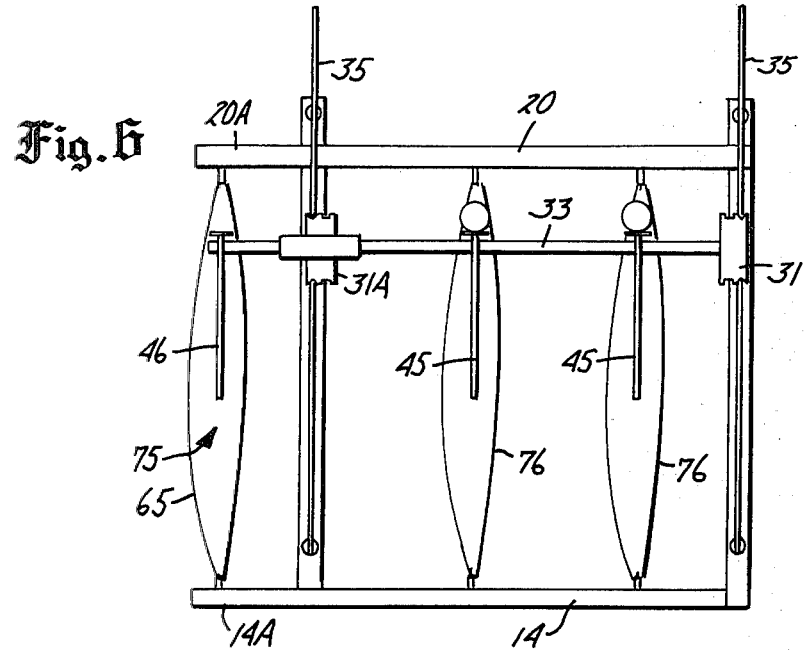
FIG. 6 is a schematic top plan view of the device of FIG. 1.

Thus it can be seen that when a large pattern such as that shown at 65 in tracing station 75, which extends substantially the entire length of the frame in fore and aft direction is being worked on, the tracing station defined in the region 75 is outboard of both of the fore and aft extending side frame members 12,12 as well as the rails 35, which support the carriage for the carving machine. Additionally, as shown schematically in FIG. 6, the outboard tracing station 75 permits an operator to walk along the pattern 65 while the workpieces indicated at 76 on the interior (within the perimeter and between side frame members 12,12) of the frame are being carved through the use of the cutter members 61 at the outer ends of the arms 45.

The rails 35,35 may be raised and lowered a limited amount to accommodate patterns and workpieces that have a large diameter. This is done through the use of a suitable hydraulic control system for the cylinders 43 shown in FIG. 7. Each of the cylinders 43 are shown there, and the rods 44 are shown schematically in FIG. 5. A control valve 80 is used when it is placed in its on position as shown, a hand pump source of pressure 81 acting through a check valve will direct hydraulic fluid under pressure to a flow divider 82 which divides the flow from the pressure line 81A equally into each of four output conduits 83, one of which leads to the base ends of each of the cylinders 43. Return flow from the rod ends returns to a drain conduit 84 and to a reservoir 84A. When the valve 80 is moved to a second position, fluid under pressure is directed from pressure conduit 81A (when the hand pump is operated) to conduit 84B leading to the rod ends of cylinders. Fluid from the base ends of cylinders must then return through the flow divider 82 back to conduit 84 and to the reservoir. Low pressure relief valves 85 are provided on the base ends of the cylinders so that excessive forces are not developed if the rails do hang up or jam. The flow divider can for example be a Delta flow divider Model PPM-2.

Various other hydraulic controls can be utilized, but it is important that each of the cylinders 43 extend or retract the respective rods 44 the same amount whenever pressure is supplied so that the rails 35 and wheels 31 and 31A are raised exactly in alignment. The rails 35 move parallel to their original positions, and parallel to the plane defined by the side members 12.

Thus, the tracing station 75 is positioned to the exterior of the perimeter of the main frame of the carving machine so that one side of the tracing station is unobstructed and an operator can walk along it and easily manipulate the tracing stylus for large pattern work. Additionally, the rails for supporting the carving machine carriages can be raised and lowered relative to the plane of the support members that are used for holding the pattern and workpieces.

What is claimed is:

1. A carving machine comprising in combination a frame, said frame having fore and aft extending side members that are spaced apart laterally from each other, and cross member means holding said fore and aft extending side members together, means on said frame positioned between said side members to support workpieces to be carved, carving arm means mounted on said frame, said carving arm means also being positioned between said side members, and tracing station arm means duplicating movements of the carving arm means positioned to the lateral side of one of said side members, means to mount a pattern to the outside of one of said side members aligned with said tracing station arm means, and means to couple and support the carving arm means and the tracing station arm means which cause the movement of the tracing station arm means to be duplicated by the carving arm means, the means to couple and support and the means to mount a pattern being supported by the frame adjacent said one side member.

2. The combination as specified in claim 1 wherein said means to mount workpieces on said frame comprise at least two cross members, said cross members extending laterally outwardly beyond the one side frame member and forming a portion of the means to mount a pattern to the exterior of the one side frame member.

3. The combination as specified in claim 1 and a pair of rails extending in fore and aft direction mounted to the side members, the means to mount the carving arm means including means movable along the rails, and means to mount the tracing arm means including means coupled to be supported by the means movable along the rails 4. The combination as specified in claim 3 and means to adjust the vertical position of the rails relative to the side members.

5. The combination as specified in claim 4 wherein the means to adjust comprises fluid pressure actuated cylinder means coupled between each side member and the respective rail.

* * * * *